June 4, 1940.  A. J. CUNNINGHAM ET AL  2,203,647
ORNAMENTAL GLASSWARE
Filed May 27, 1939
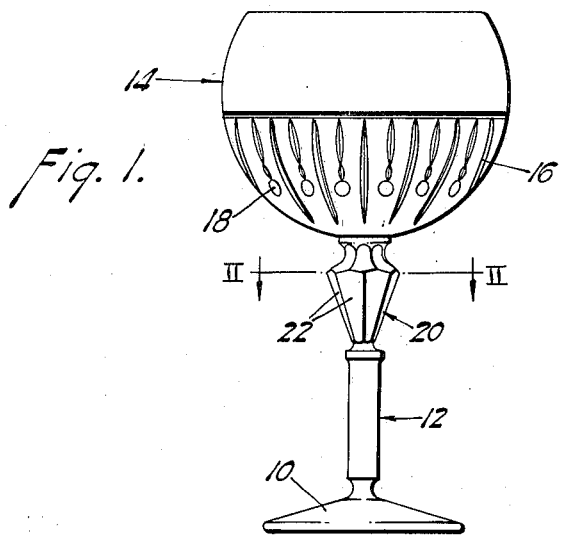
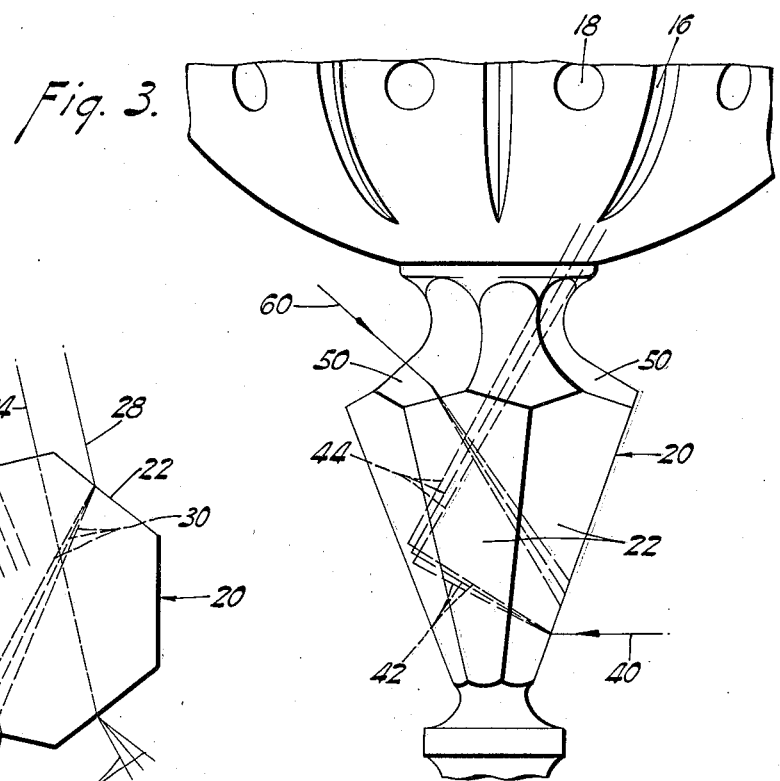
INVENTORS
ANDREW J. CUNNINGHAM
AND VICTOR WALKER
BY
Beau, Brooks, Buckley & Beau.
ATTORNEYS Patented June 4, 1940

2,203,647

UNITED STATES PATENT OFFICE 2,203,647

ORNAMENTAL GLASSWARE

Andrew J. Cunningham, Eggertsville, N. Y., and Victor Walker, Fort Erie, Ontario, Canada, assignors to Alfred H. Sharpe, Buffalo, N. Y.

Application May 27, 1939, Serial No. 276,214

11 Claims. (Cl. 65—13)

This invention relates to table glassware and more particularly to ornamental beverage drinking glassware of stemmed variety.

One of the objects of the invention is to provide stemmed glassware of a type readily adapted to be made by simple manufacturing processes and capable of refracting and reflecting externally incident light in an improved manner and with an increased degree of brilliance and chromatic dispersion effects.

Another object of the invention is to provide a combination goblet bowl and stem structure that will appear to be more brilliantly illuminated with chromatic and/or achromatic lights as a result of reflection and refraction of an increased proportion of the light incident thereto from external light sources.

Other objects and advantages of the invention will appear from the specification herein.

In the drawing:

Fig. 1 is a view in elevation of a glassware goblet of the invention;

Fig. 2 is a horizontal section, on an enlarged scale, taken substantially along line II—II of Fig. 1 in which is illustrated diagrammatically horizontal projections of typical refractive and chromatic dispersive and reflective passages of light through a portion of the stem structure thereof; and Fig. 3 is a view, on an enlarged scale, of a portion of the goblet of Fig. 1 illustrating diagrammatically vertical projections of typical light ray dispersive and reflective passages through the structure, and of the illumination thereby with multi-colored lights of the superposed goblet bowl.

In connection with the provision of ornamental glassware of the types adapted to reflect and refract external light for the purpose of providing chromatic dispersion and sparkling light effects, it has been customary to form such objects generally in the shape of prismatic elements, and such structures are usually made by casting or pressing heat-softened glass in molds which are later withdrawn upon hardening of the glass. Consequently, multi-sided prismatic structures of this type have been of an even number of sides, so as to be, for example, hexagonal or octagonal in section, as these forms are easily made in two-piece molds which can be withdrawn without leaving parting lines intermediately of the prism faces. However, such regular prisms of even numbers of sides are deficient from the standpoint of effective reflection and refraction and chromatic dispersion of external light because of the fact that such prisms have paired directly opposite and parallel sides through which a substantial portion of the external light will be directly transmitted without reflection and refraction and/or chromatic dispersion effects.

Also in connection with the manufacture of ornamental table glassware it is customary to provide the surface portions thereof with various forms of ornamental features, such as by etching, painting, cutting, or the like; and in the case of such ornamental bowls the reflection of light from various external light sources against the facet-like elements of the ornamentation produces some degree of sparking effect. However, due to the usual relatively thin section of the goblet bowl in the region of the bowl ornamentation, the light refracted in the region of the bowl wall ornamental is incapable of producing marked chromatic dispersion effects. Consequently, in the case of conventional goblet structures the lighting effects obtained by the cut bowl ornamentation are substantially limited to the external reflective results obtained by reason of angular light-ray impingement upon the facet-like faces of the ornamentation cuts. Also, in the case of conventional goblet stems or the like, the lighting effects obtained are similarly limited substantially to those resulting from the external light-reflection type of action.

The present invention contemplates the provision of a novel form of multi-sided light refractive and reflecting glassware stem, and a novel form of combination foot and stem and bowl table glassware structure by reason of which light from external sources is introduced into the interior of the structure with maximum chromatic dispersion and internal reflection effects and distributed in the form of multi-colored lights throughout the structure to the end that the facet-like elements of the ornamentation features thereof appear to be illuminated in an improved manner. For example, Fig. 1 illustrates, in elevation, a goblet of the invention wherein a conventional type foot 10 supports a stem 12 upon which a bowl 14 is mounted. The foot 10 may be of any desired form but preferably inclines upwardly toward the central stem portion as shown, to provide a reflecting surface at the base of the goblet for directing the majority of light incident thereto upwardly into the stem and bowl portions of the goblet. The bowl 14 may be of any desired shape and sectional form, and will preferably be ornamented by means of some form of surface irregularities, such as inwardly extending cuts or protuberances 16 and 18.

The stem includes a pyramidal element 20 having seven side facets 22. In practice the element 20 may comprise substantially the entire stem structure, or may be only a portion thereof used in combination with another stem portion 12 as illustrated herein, and may have any desired odd number of sides or facets 22. As shown in the drawing, the stem element 20 is of seven-sided form; and as shown diagrammatically in Fig. 2, light rays 24 normal to any one of the facets 22 will be transmitted through the structure and refracted upon emergence therefrom as at 26 and chromatically dispersed. Also, as illustrated in Fig. 2, light rays 28 angularly incident to the facets 22 will be refracted at the points of entrance and simultaneously chromatically dispersed as at 30, and transmitted through the structure in the form of multi-colored light ray elements toward an opposing facet. Upon contact with the opposing facet the light ray elements will either be reflected therefrom internally of the structure as at 32 or will emerge therefrom as at 34, or will function in the manner of a combination of the two above described actions depending upon the angles of incidence of the light ray elements 30 relative to the opposing facet. Any reflected light ray elements 32 will illuminate the facet incident thereto with multi-colored lighting effects which may be viewed by an observer through the stem structure from a position opposite thereto. Also, the facet incident to the light ray elements 30 will appear to be illuminated by multi-colored lights to an observer. Therefore, it will be understood that by reason of the absence of any paired directly opposing facet structural relationship light entering the stem 12 from externally thereof will be refracted and chromatically dispersed either at the point of entry or at the point of emergence therefrom, and that a substantial portion of the light gaining access to the interior of the stem will be internally reflected therein with the result that all light coming into contact with the stem will be usefully employed in the production of sparkling and/or chromatic illumination effects in the stem from the standpoint of the observer. As distinguished from this, conventional glassware stems having transverse sections in the form of regular polygons having even numbers of sides provide for direct transmission of substantial portions of the light incident thereto through the stem and directly opposed and parallel facet portions thereof in the form of unrefracted and chromatically unaltered light rays, thus providing a stem illumination effect of minor qualities.

The invention further features the superposing of the goblet bowl 14 above the stem element 20 and the inclination of the facets 22 relative to the vertical axis of the stem, with the result that the refracted and/or chromatically dispersed light ray elements entering the stem structure and reflected internally therethrough will be simultaneously directed upwardly through reflection processes into the structure of the goblet bowl 14 whereby the irregularities of the bowl surface constituting ornamentation features thereof will appear to be illuminated with brilliant and/or multi-colored lights.

As illustrated in Fig. 3, a light ray 40 angularly incident in a vertical plane to one of the facets 22 will be chromatically dispersed and refracted as at 42 and directed upwardly in angularly incident relation to an opposing facet and reflected thereby as at 44 upwardly into the goblet bowl structure where the elements thereof will strike upon facet-like portions of the bowl ornamentation elements 16 and 18 and impart to the latter the appearance of being illuminated with brilliant and chromatic light.

Another feature of the invention involves the provision of supplementary facets 50 arranged in opposed inclined relation with respect to the facets 22 whereby convergence and reflection of incoming light rays interiorly of the stem 12 is augmented. The supplementary facets 50 may be arranged as illustrated in such manner as to bridge the respective parting lines between the facets 22, or in any other arrangement form wherein the adjacent facets 50 and 22 are in angular relationship to each other. For example, as illustrated in Fig. 3, a light ray 60 coming from overhead at an angle will enter an incident supplementary facet 50 and pass through the stem in the form of chromatic light toward an opposed facet 22 from which the chromatic light ray elements will be reflected internally of the stem structure in accordance with the laws governing light reflection, and thus the brilliant chromatic illumination of the stem will be augmented.

We have found that the brilliance of the illumination of glassware produced in accordance with the invention will be considerably increased upon grinding the surfaces of the facet elements of the stem to accurate plane form subsequent to the molding thereof. Therefore, we prefer to grind the facets 22 and/or 50 of the goblet stem illustrated herein and to subsequently polish them by any suitable method. In connection with the process of molding the stem element 20, therefore, a two-piece mold may be satisfactorily employed even though a parting line will appear upon the molded stem intermediately of at least one of the stem facets 22 and one of the stem facets 50, because the subsequent grinding and polishing steps will satisfactorily remove the ridges of excess glass so formed on the stem and reduce the stem structure perfectly to prescribed form.

Although the drawing herein shows specifically a glassware construction embodying a stem element of seven-sided form it is to be understood that the invention contemplates the provision of a faceted and geometrically regular stem element having any odd number of sides, such as 5, 7, 9, or the like, since the novel light refraction and reflection action of the invention will be provided in such stem elements as described hereinabove in connection with the seven-sided structure. It will also be understood that the stem element of the invention may be provided in any other suitable polyhedronal forms such as have sections transversely of the longitudinal axes thereof of geometrically irregular form, so that even though such stems may have even numbers of sides there will be no directly opposed parallel side facets whereby light would be enabled to pass directly through the stem in a direction normal to two opposed facets thereof and hence without refraction and chromatic dispersion effects. Also, it will be understood that the stem portion of the glassware of the invention may be initially formed into general shape by means of any other suitable method in lieu of the pressing method hereinabove described preparatory to being finally ground into the novel faceted form of the invention. Also, it will be understood that the facet surfaces 22 of the stem element 20 may be arranged to incline toward the bowl portion 14 instead of toward the foot portion 10 as illustrated in the drawing. In such case the stem element 20 will also be adapted to function in accord with the concept of the invention to provide improved light reflecting and refracting effects throughout the stem and bowl structures. Also, the stem element 20 of the invention may be used in multiples in single stem structures to provide composite stem structures involving the improvements of the invention, and the novel stem element of the invention may be arranged in any desired manner with respect to the other structural elements of the goblet shown in the drawing, or may be used in connection with the construction of beverage drinking glassware of forms other than the goblet type shown and described herein. For example, with respect to the form of goblet shown in Fig. 1, the relative positions of the stem elements 20 and 12 may be reversed; or the stem portion 12 may be omitted entirely; and the foot piece 10 may be of any other desired form of construction other than that shown and described hereinabove. It will also be understood that the stem element 20 may be provided with accessory ornamental features in the form of cuts extending into the surface portions thereof or protuberances extending outwardly therefrom or any other desired form of ornamental features whereby the general form of the facets will be in part interrupted, leaving the uninterrupted portions thereof adapted to function in the manner of the invention hereinabove described.

Although only one form of the invention has been shown and described in detail, it will be apparent to those skilled in the art that the invention is not so limited but that various changes may be made therein without departing from the spirit of the invention or from the scope of the appended claims.

We claim:

1. A glass drinking goblet comprising essentially a foot, an elongate solid glass stem mounted upon said foot, and a bowl mounted upon said stem, said stem being of regular pyramidal form and having an odd number of sides inclined toward the vertical axis of said stem and inwardly thereto toward said foot, said foot being of pyramidal form and joining said stem at the apex thereof.

2. A beverage drinking vessel of stemmed variety formed of transparent and light refracting material and comprising essentially a foot, a solid stem mounted upon said foot, and a bowl mounted upon said stem, said stem having a portion of regular prismatic form with an odd number of sides.

3. A solid transparent glass stem for a beverage drinking glass comprising an element of polyhedronal geometric form having a transverse section in the form of a polygon with no directly opposed parallel sides.

4. An ornamental glassware article comprising essentially a foot, a bowl, and an elongate stem disposed therebetween, said stem being of solid transparent glass and of a polyhedronal form of transverse sectional shape in the form of a regular polygon having an odd number of sides.

5. A glass drinking goblet comprising essentially a foot, a bowl, and an elongate stem disposed therebetween, said stem being of solid transparent glass and of a polyhedronal form of transverse sectional shape in the form of a regular polygon having an odd number of sides, said sides being inclined toward the major axis of said stem.

6. A glass drinking goblet comprising essentially a foot, a bowl, and an elongate stem disposed therebetween, said stem being of solid transparent glass and of a polyhedronal form of transverse sectional shape in the form of a regular polygon having an odd number of sides, said sides being inclined toward the major axis of said stem and inwardly thereto toward said foot.

7. A glass drinking goblet comprising essentially a foot, a bowl, and an elongate stem disposed therebetween, said stem being of solid transparent glass and of a regular prismatic form having an odd number of sides.

8. A glass drinking goblet comprising essentially a foot, a bowl, and an elongate stem disposed therebetween, said stem being of solid transparent glass and of a regular pyramidal form having an odd number of sides.

9. A glass drinking goblet comprising essentially a foot, a bowl, and an elongate stem disposed therebetween, said stem being of solid transparent glass and of a polyhedronal form of transverse sectional shape in the form of a regular polygon having an odd number of sides, said sides being inclined toward the major axis of said stem and inwardly thereto toward said foot, said bowl being provided with ornamentation features in the form of surface irregularities.

10. A glass drinking goblet comprising essentially a foot, a bowl, and an elongate stem disposed therebetween, said stem being of solid transparent glass and of bi-pyramidal form, the opposed bi-pyramidal portions of which are shaped in transverse section in the form of regular polygons having equal and odd numbers of sides, the facet sides of the opposed pyramidal portions of said stem being so relatively arranged that the facet portions of one of said pyramidal sections span the lines of juncture between the facet portions of the opposed pyramidal portion.

11. An ornamental glassware article comprising a hollow receptacle portion and a solid transparent glass stem supporting said receptacle portion, said stem comprising an element of polyhedronal geometric form having a transverse section in the form of a polygon with no directly opposed parallel sides.

ANDREW J. CUNNINGHAM.
VICTOR WALKER.